(12) United States Patent
Matsuda et al.

(10) Patent No.: US 10,355,915 B2
(45) Date of Patent: Jul. 16, 2019

(54) CONTROL APPARATUS, CONTROL METHOD, AND INFRASTRUCTURE CONTROL SYSTEM

(71) Applicant: Kabushiki Kaisha Toshiba, Minato-ku (JP)

(72) Inventors: Yoshiyuki Matsuda, Chiba (JP);
Yoshitaka Kobayashi, Kawasaki (JP);
Makoto Ochiai, Fussa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 180 days.

(21) Appl. No.: 15/673,908

(22) Filed: Aug. 10, 2017

(65) Prior Publication Data

US 2017/0364052 A1 Dec. 21, 2017

Related U.S. Application Data

(60) Division of application No. 15/266,710, filed on Sep. 15, 2016, now abandoned, which is a division of
(Continued)

(30) Foreign Application Priority Data

May 18, 2012 (JP) ................................. 2012-114961

(51) Int. Cl.
*H04L 12/24* (2006.01)
*G05B 11/01* (2006.01)
(Continued)

(52) U.S. Cl.
CPC .......... *H04L 41/0663* (2013.01); *G05B 9/03* (2013.01); *G05B 11/01* (2013.01); *G05B 15/02* (2013.01);
(Continued)

(58) Field of Classification Search
CPC .................. G05B 9/03; G05B 19/0428; G05B 2219/24182; G05B 2219/24192;
(Continued)

(56) References Cited

U.S. PATENT DOCUMENTS 5,963,540 A * 10/1999 Bhaskaran ........ H04L 29/12009
370/218
6,363,422 B1 3/2002 Hunter et al.
(Continued)

FOREIGN PATENT DOCUMENTS

CN 101608600 A 12/2009
EP 0 967 766 A2 12/1999
(Continued)

OTHER PUBLICATIONS

International Search Report dated Jun. 25, 2013 in PCT/JP2013/057813 (with English translation of Category of Cited Documents).
(Continued)

*Primary Examiner* — Crystal J Barnes-Bullock
(74) *Attorney, Agent, or Firm* — Oblon, McClelland, Maier & Neustadt, L.L.P.

(57) ABSTRACT

According to one embodiment, a system includes control apparatus and server. Control apparatus includes collector, transmitter, receiver and main controller. Collector collects sensing data concerning control targets in social infrastructure. Transmitter transmits collected sensing data to server. Receiver receives control instruction from server. Main controller controls control targets based on control instruction. Server includes acquisition unit, database, generator and instructor. Acquisition unit acquires sensing data from control apparatus. Database stores sensing data. Generator generates control instruction by processing sensing data. Instructor transmits generated control instruction to control apparatus.

16 Claims, 10 Drawing Sheets

Related U.S. Application Data application No. 13/934,480, filed on Jul. 3, 2013, now Pat. No. 9,494,924, which is a continuation of application No. PCT/JP2013/057813, filed on Mar. 19, 2013.

(51) Int. Cl.

| | | |
|---|---|---|
| *G05B 19/042* | (2006.01) | |
| *G05B 9/03* | (2006.01) | |
| *H04L 12/703* | (2013.01) | |
| *G06F 11/07* | (2006.01) | |
| *H04L 12/707* | (2013.01) | |
| *H04L 12/717* | (2013.01) | |
| *H04L 12/939* | (2013.01) | |
| *H04L 29/14* | (2006.01) | |
| *G05B 15/02* | (2006.01) | |
| *H04L 12/28* | (2006.01) | |
| *H04L 12/26* | (2006.01) | |

(52) U.S. Cl.
CPC ...... *G05B 19/0428* (2013.01); *G06F 11/0793* (2013.01); *H04L 12/2852* (2013.01); *H04L 43/0847* (2013.01); *H04L 45/22* (2013.01); *H04L 45/28* (2013.01); *H04L 45/42* (2013.01); *H04L 49/557* (2013.01); *H04L 69/40* (2013.01); *G05B 2219/24182* (2013.01); *G05B 2219/24192* (2013.01); *G05B 2219/24199* (2013.01); *Y04S 10/30* (2013.01)

(58) Field of Classification Search
CPC ....... G05B 2219/24199; G06F 11/0793; H04L 41/0663; H04L 45/22; H04L 45/28; H04L 45/42; H04L 49/557; H04L 69/40
See application file for complete search history.

(56) References Cited

U.S. PATENT DOCUMENTS

| | | | | |
|---|---|---|---|---|
| 7,055,173 B1* | 5/2006 | Chaganty | ............ | H04L 41/0654 726/11 |
| 7,640,275 B2* | 12/2009 | Bridge, Jr. | .......... | G06F 11/1461 |
| 7,840,829 B2 | 11/2010 | Mizukami | | |
| 8,148,835 B2 | 4/2012 | Jurkat | | |
| 8,862,938 B2 | 10/2014 | Souvannarath | | |
| 9,559,947 B2* | 1/2017 | Bottari | ................. | H04Q 3/0079 |
| 9,600,380 B2* | 3/2017 | Mizuno | ............... | G06F 11/1438 |
| 2003/0187967 A1* | 10/2003 | Walsh | ................ | H04L 41/0672 709/223 |
| 2007/0002730 A1* | 1/2007 | Lu | ....................... | G06F 11/0793 370/216 |
| 2009/0216345 A1 | 8/2009 | Christfort | | |
| 2009/0309360 A1 | 12/2009 | Jurkat | | |
| 2012/0215829 A1 | 8/2012 | Naphade | | |
| 2013/0310952 A1* | 11/2013 | Matsuda | ................ | G05B 11/01 700/9 |
| 2014/0371942 A1 | 12/2014 | Matsuyama | | |
| 2017/0199515 A1* | 7/2017 | Bhat | ................. | G05B 19/4184 |

FOREIGN PATENT DOCUMENTS

| | | |
|---|---|---|
| JP | 2002-23834 | 1/2002 |
| JP | 2003-199179 | 7/2003 |
| JP | 2005-309661 | 11/2005 |
| JP | 2007-323173 | 12/2007 |
| KR | 10-2006-0101990 | 9/2006 |
| KR | 10-2006-0121962 | 11/2006 |
| WO | WO2013172088 A1 | 11/2013 |

OTHER PUBLICATIONS

Office Action dated Aug. 13, 2014 in Korean Patent Application No. 10-2013-7015936 ( with English language translation).
Office Action dated Aug. 21, 2015 in Korean Patent Application No. 10-2013-7015936 (with English translation).
Written Opinion dated Jun. 16, 2015 in Singaporean Patent Application No. 2013052691.
Singaporean Search Report and Written Opinion dated Dec. 10, 2013 in Patent Application No. 201305269-1.
Wenye Wang, et al., "A survey on the communication architectures in smart grid", Computer Networks, vol. 55, 2011, pp. 3604-3629.
International Search Report dated Jun. 25, 2013 in PCT/JP 2013/057813 (submitting English translation only).
Extended European Search Report dated May 10, 2016, for EP 13731018.1.
Japanese Office Action dated Jun. 21, 2016, for JP2013-512905 (English translation provided).
Combined Chinese Office Action and Search Report dated Aug. 19, 2016 in patent application No. 201380000404.4 with English translation.

* cited by examiner

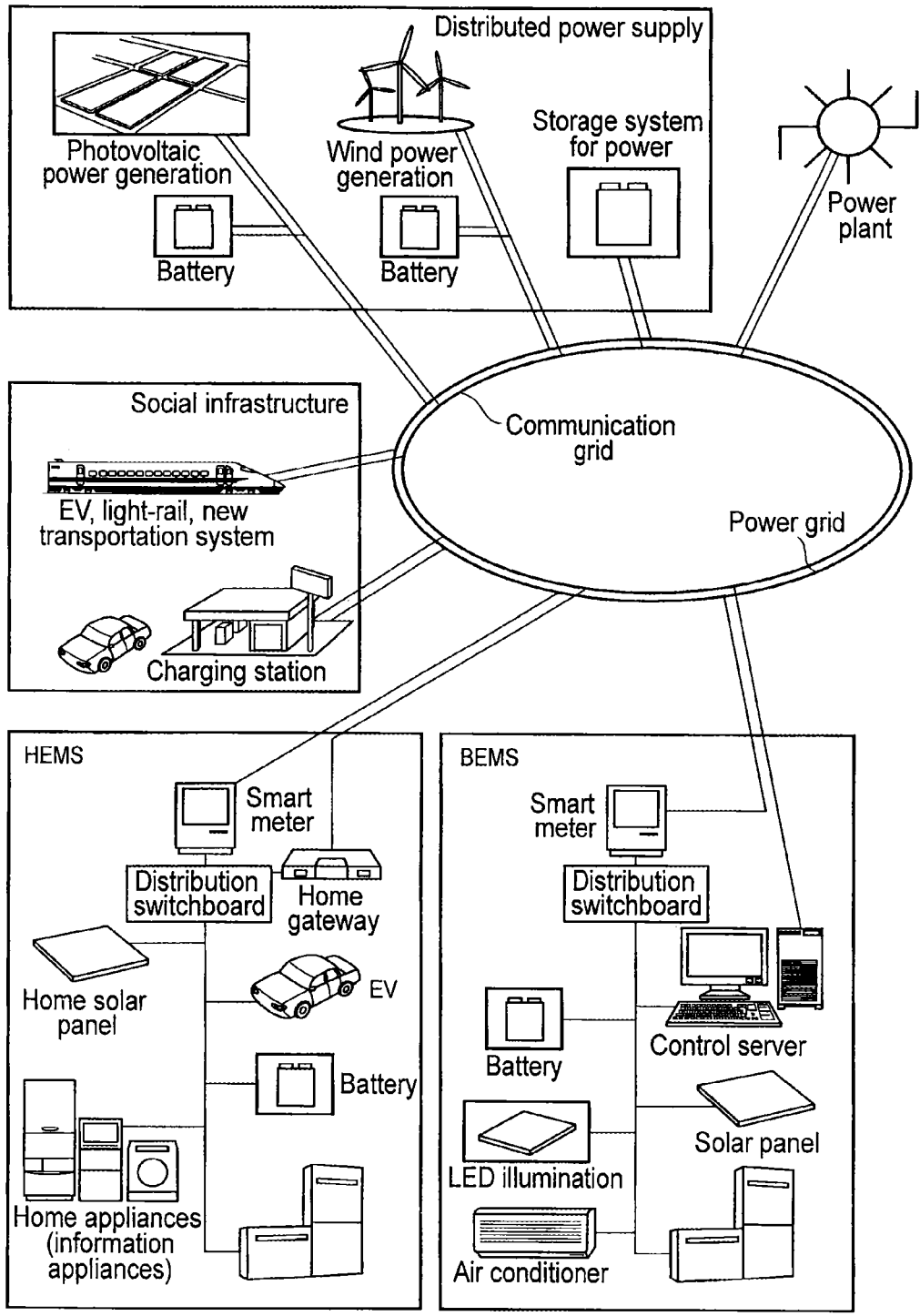
F I G. 1

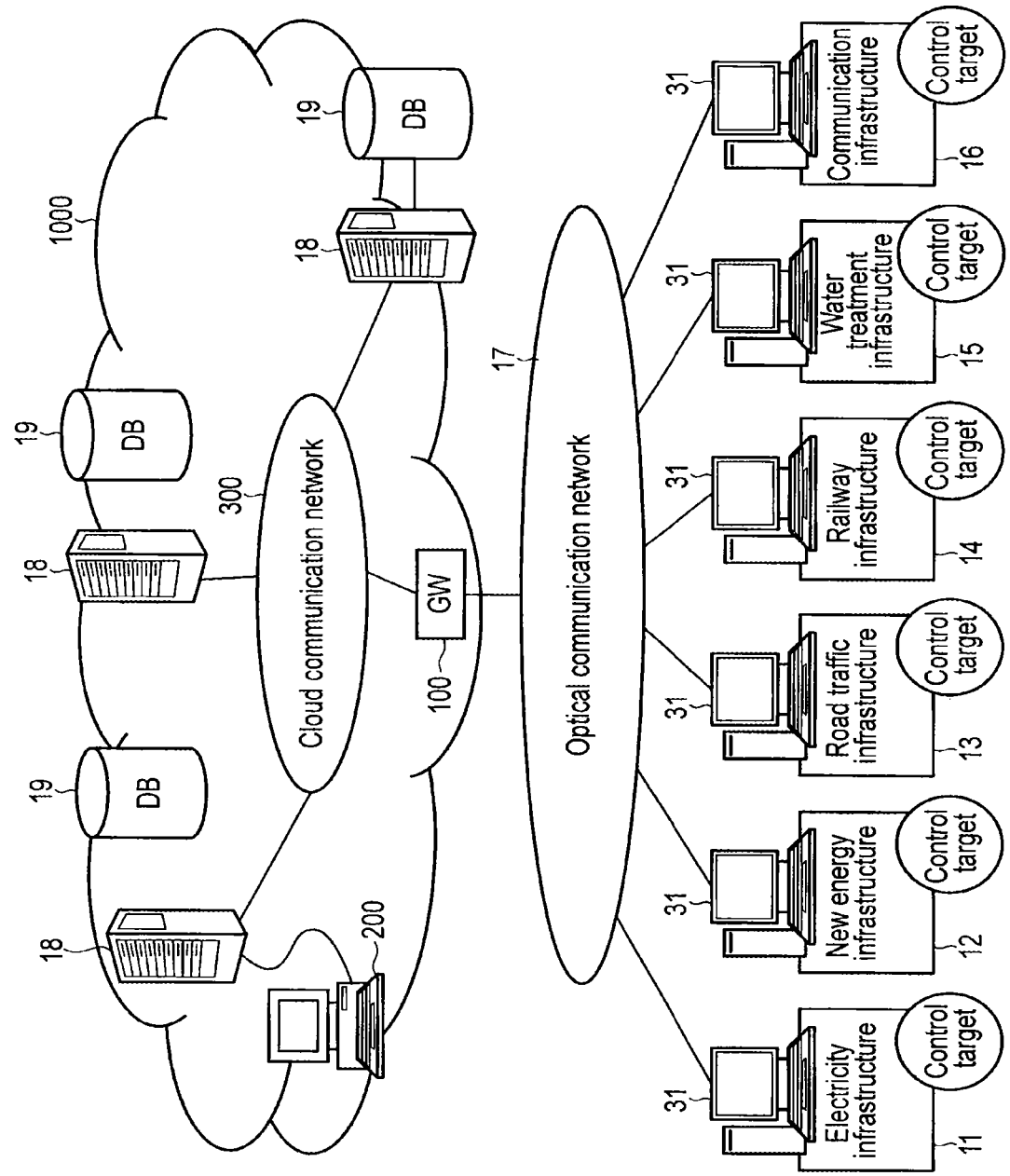
F I G. 2

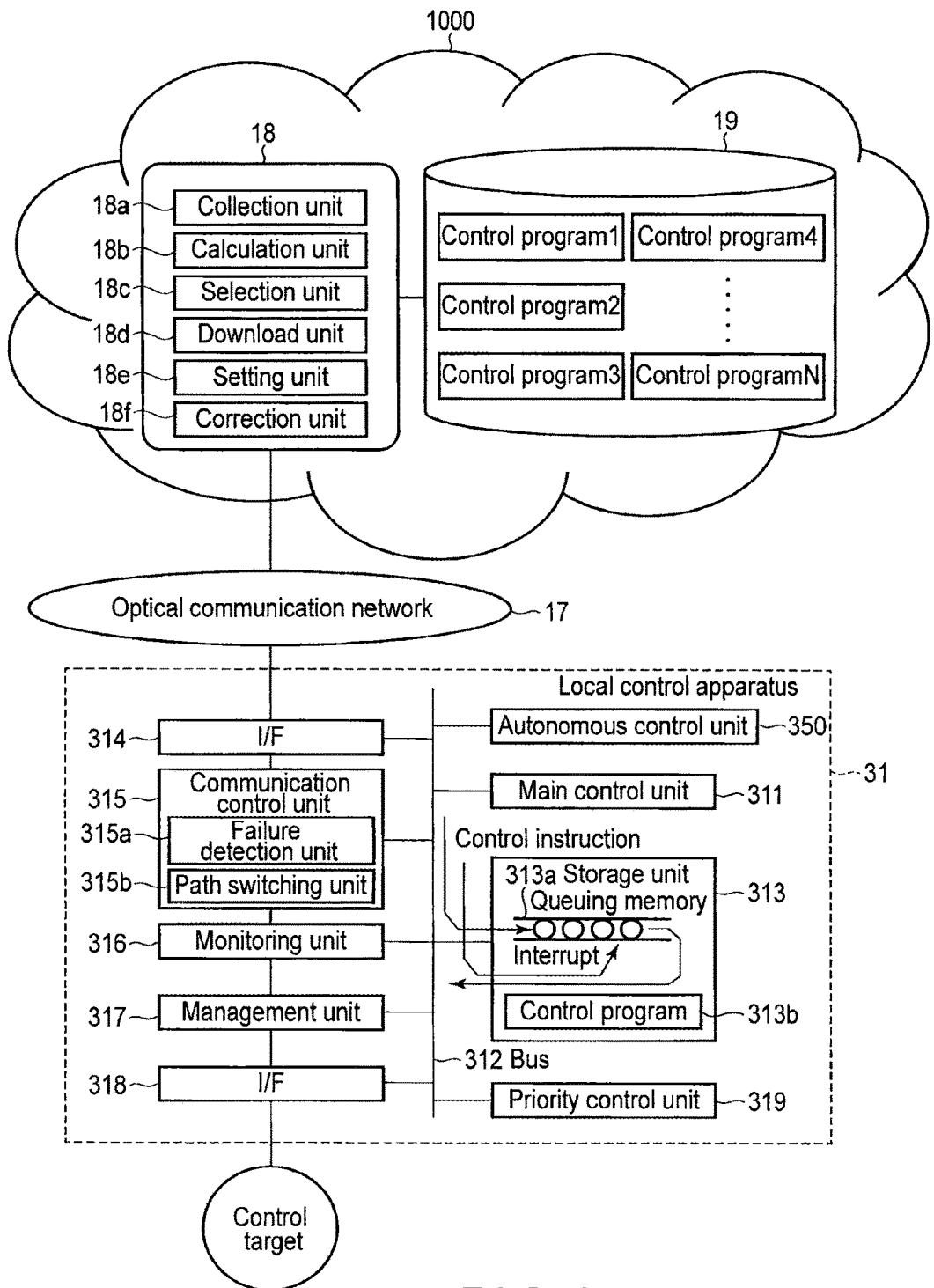
F I G. 4

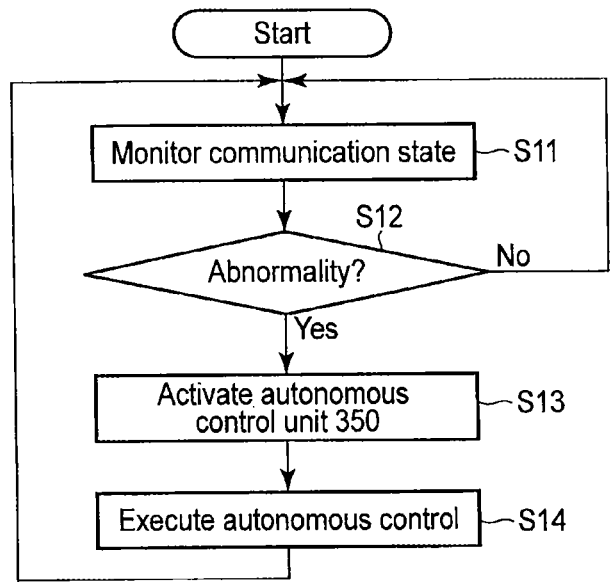
F I G. 5
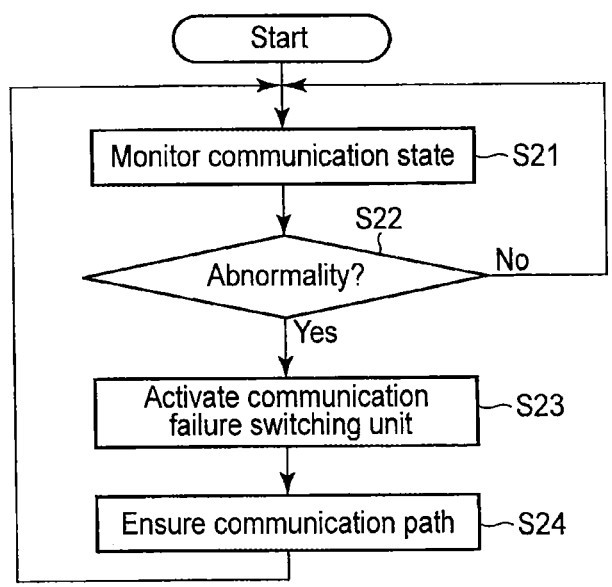
F I G. 6

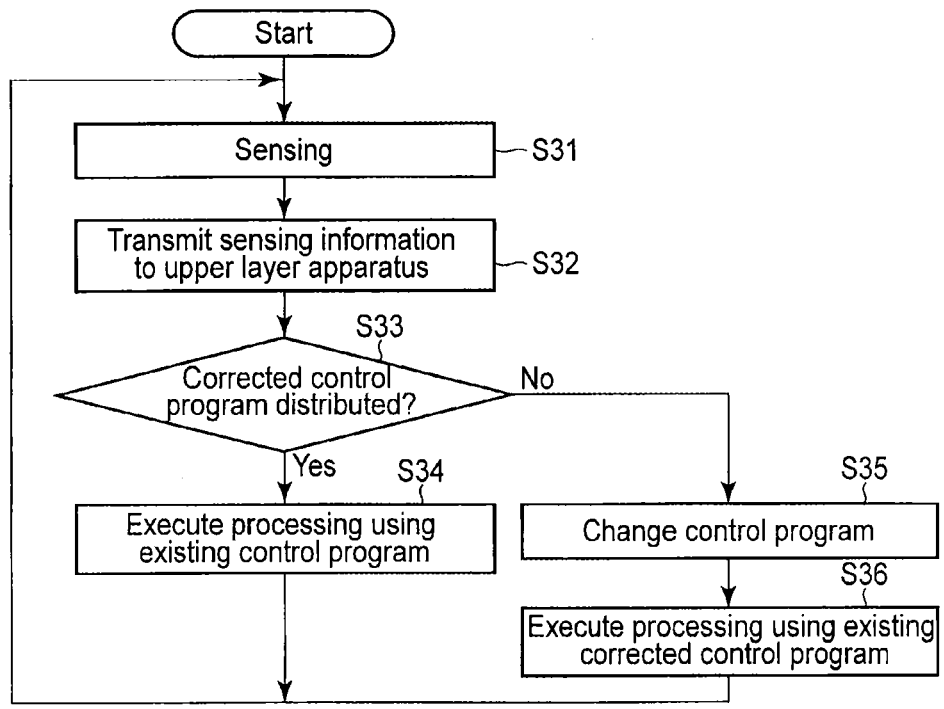
F I G. 8
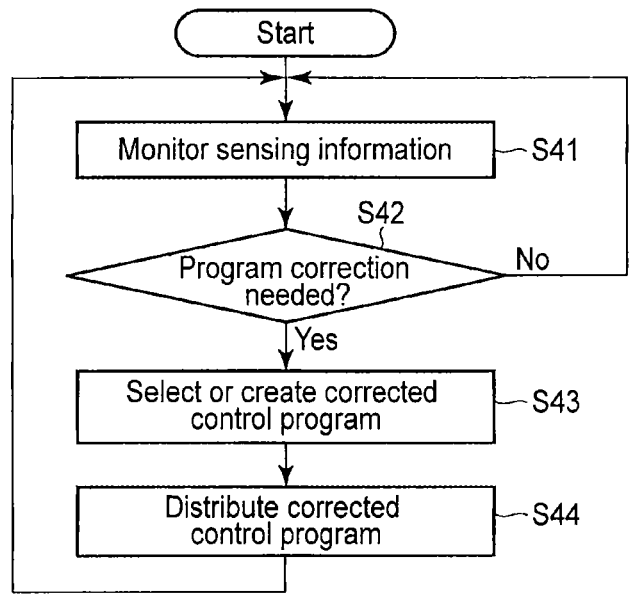
F I G. 9

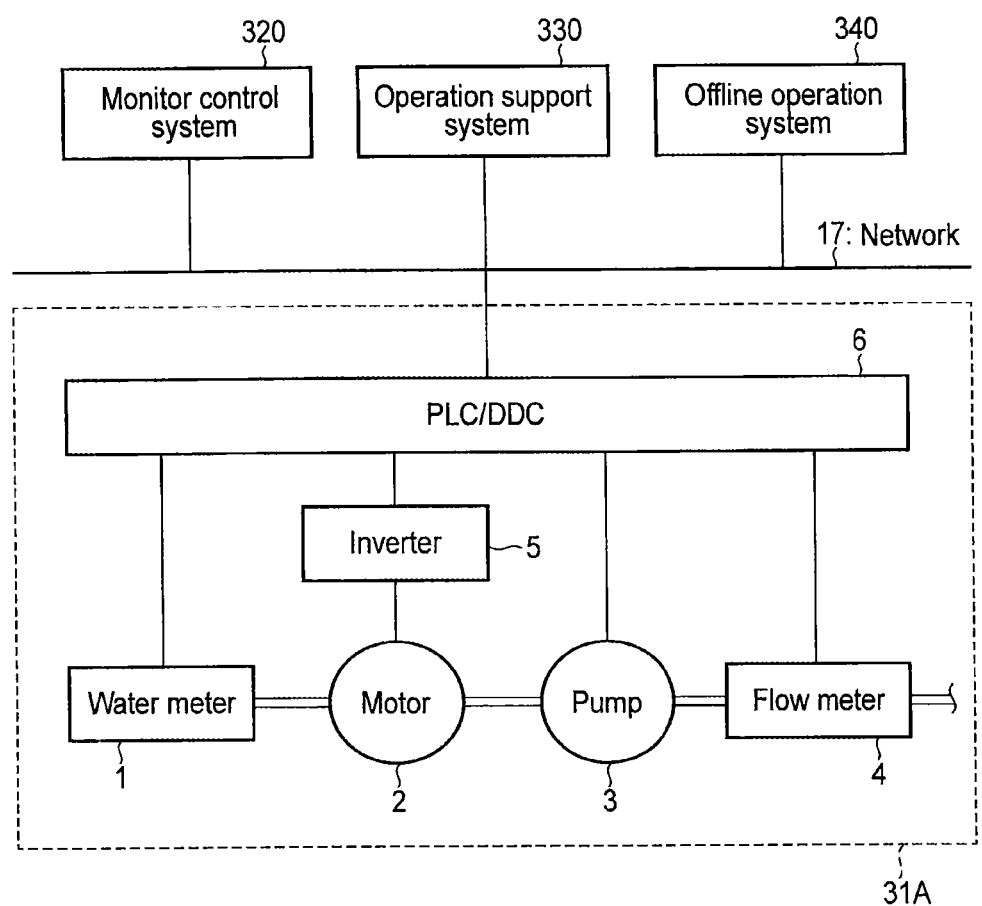
F I G. 10

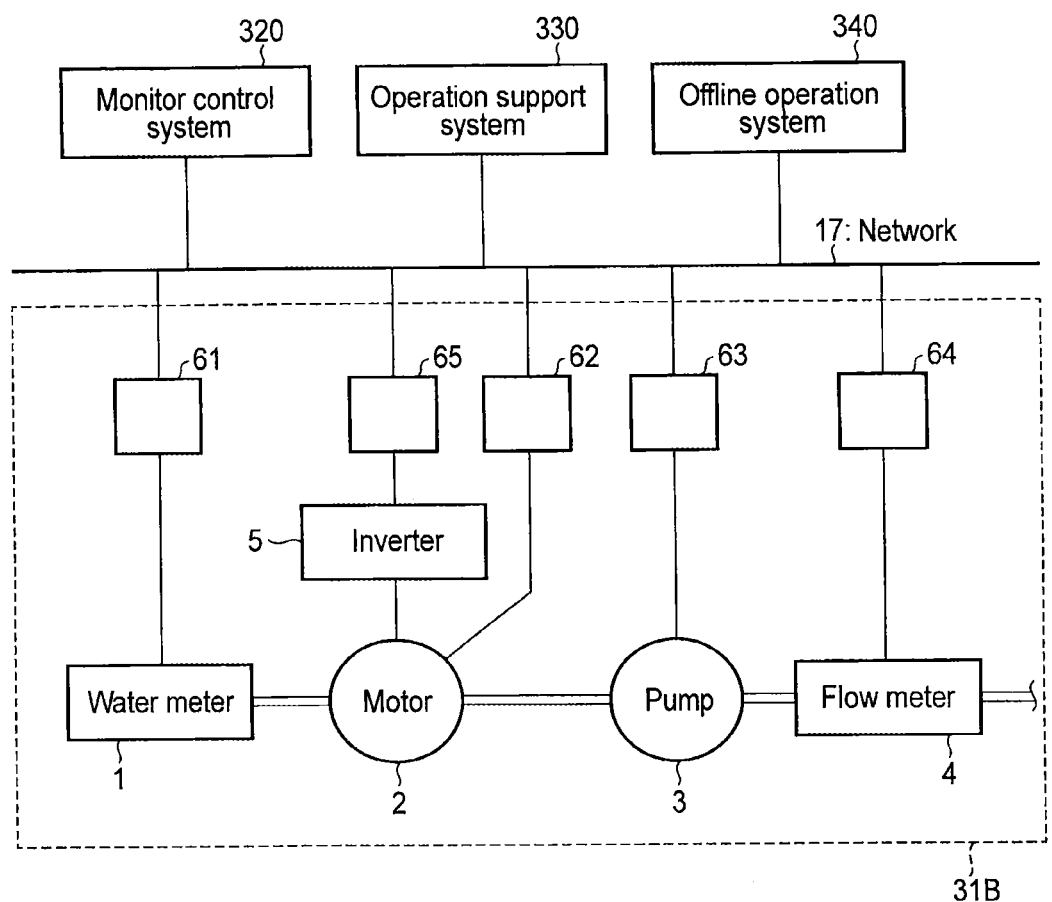
F I G. 11

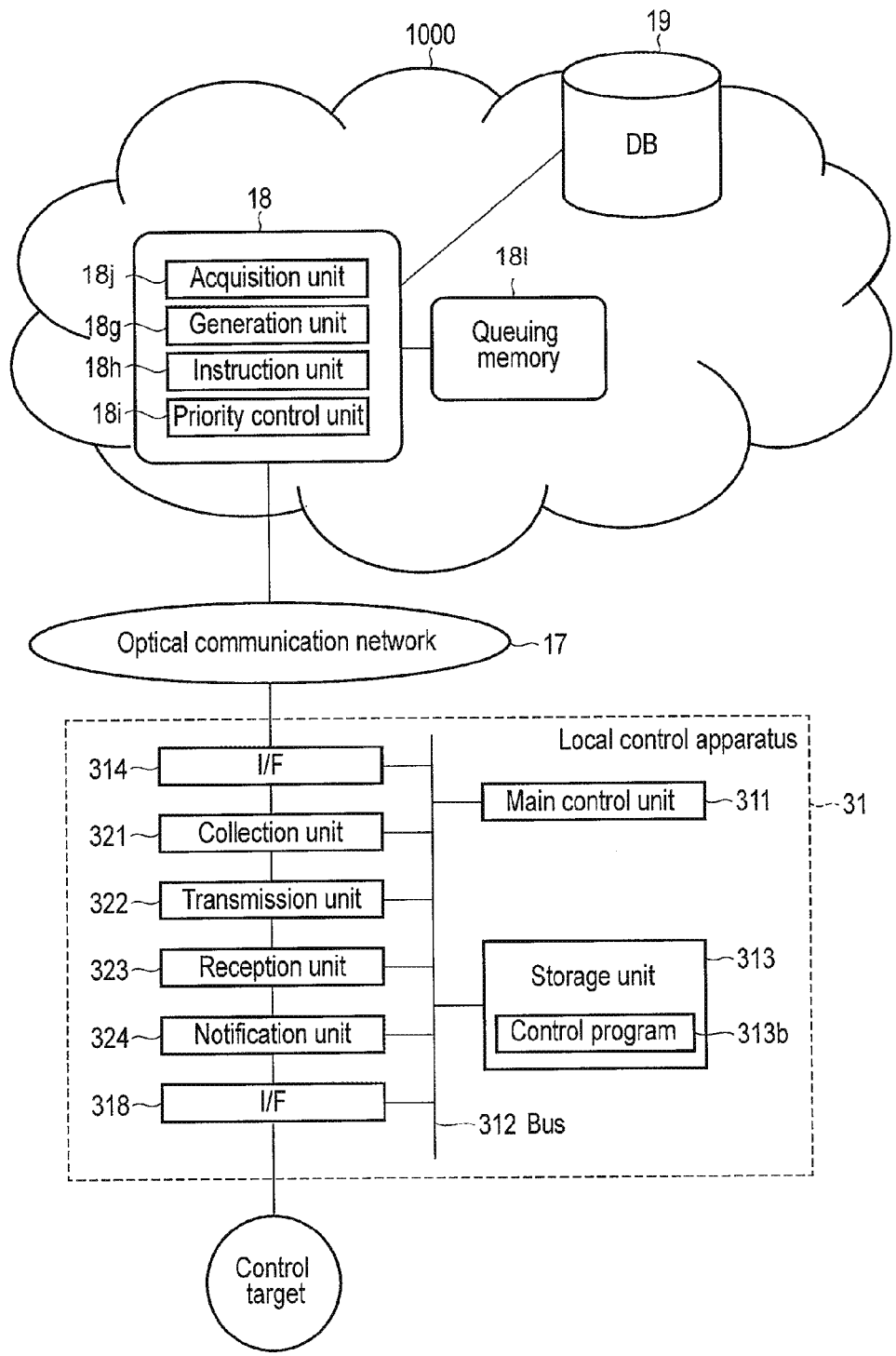
F I G. 12

CONTROL APPARATUS, CONTROL METHOD, AND INFRASTRUCTURE CONTROL SYSTEM

CROSS-REFERENCE TO RELATED APPLICATIONS

This application is a Divisional Application of U.S. Ser. No. 15/266,710, filed Sep. 15, 2016, which is a divisional of U.S. application Ser. No. 13/934,480, filed Jul. 3, 2013 (now U.S. Pat. No. 9,494,924, issued Nov. 15, 2016), the entire contents of which are incorporated herein by reference. U.S. Ser. No. 13/934,480 is a Continuation Application of PCT Application No. PCT/JP2013/057813, filed Mar. 19, 2013 and based upon and claiming the benefit of priority from Japanese Patent Application No. 2012-114961, filed May 18, 2012, the entire contents of all of which are incorporated herein by reference.

FIELD

Embodiments described herein relate generally to techniques for controlling infrastructures.

BACKGROUND

A society (community) where people live is supported by a wide variety of infrastructures such as electricity, waterworks, transportation, railways, communications, and buildings. There is much heated debate about how to create a social system without forcing people who use the infrastructures to put up with inconveniences in life.

BRIEF DESCRIPTION OF THE DRAWINGS

FIG. 1 is a view showing an example of a system according to an embodiment;

FIG. 2 is a view showing an example of a social infrastructure control system according to the embodiment;

FIG. 4 is a conceptual view showing the cooperative configuration between a local control apparatus 31 according to the first embodiment and a server 18 that is the upper layer apparatus of the local control apparatus 31;

FIG. 5 is a flowchart showing the processing procedure of autonomous control of the local control system shown in FIG. 4;

FIG. 6 is a flowchart showing the processing procedure of the local control system shown in FIG. 4 at the time of communication path switching;

FIG. 8 is a flowchart showing the control program correction procedure of the local control apparatus 31 shown in FIG. 4;

FIG. 9 is a flowchart showing the corrected control program providing procedure of the server 18 shown in FIG. 4;

FIG. 10 is a functional block diagram showing an example of a social infrastructure control system according to the first embodiment;

FIG. 11 is a functional block diagram showing another example of the social infrastructure control system according to the first embodiment; and FIG. 12 is a functional block diagram showing an example of a local control apparatus 31 and a server 18 according to the second embodiment.

DETAILED DESCRIPTION

Figure 3:
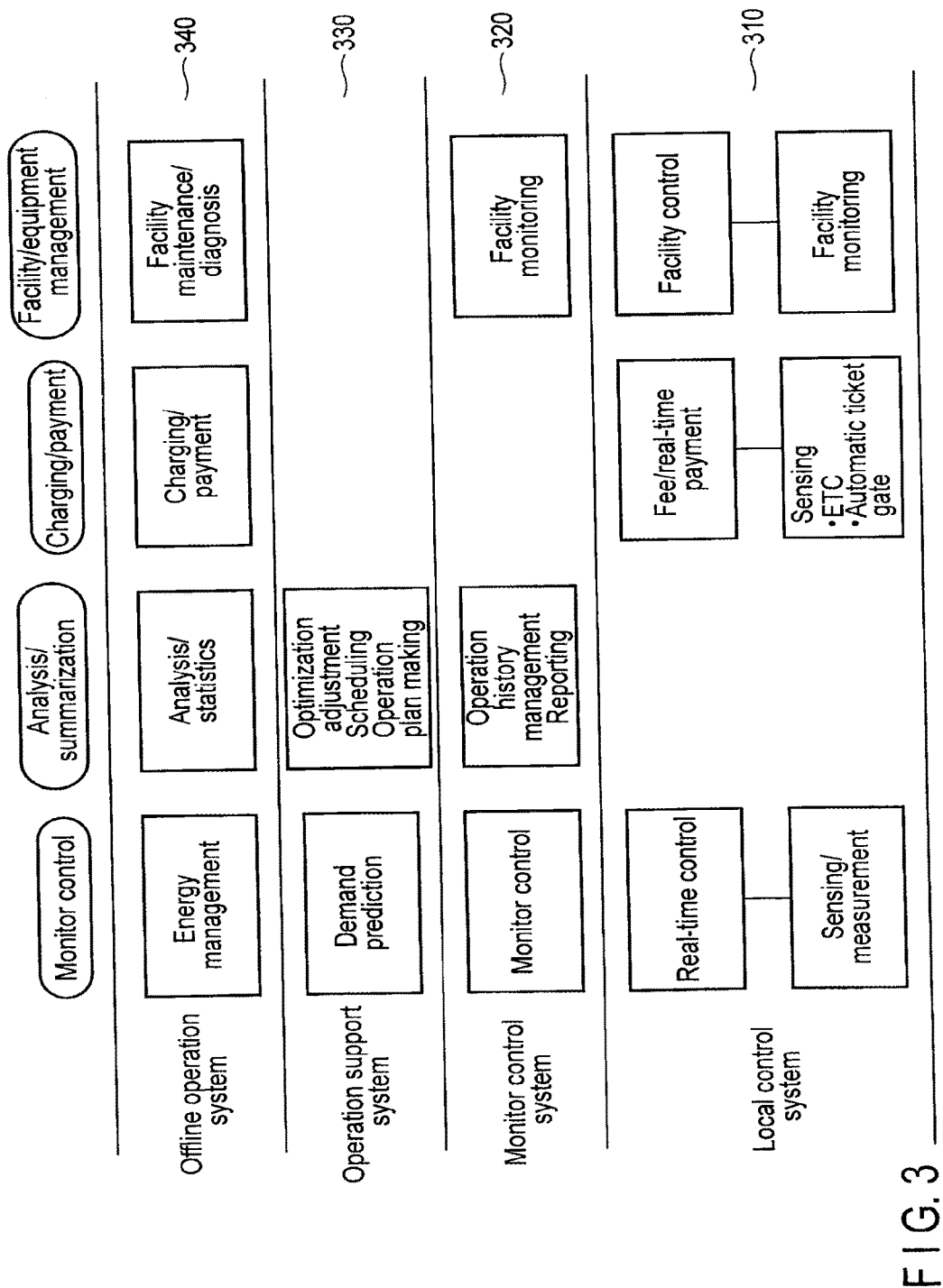
FIG. 3 is a view showing an example of the architecture of a social system.

In general, according to an embodiment, a control apparatus for an infrastructure control system controls an infrastructure. The control apparatus includes at least one processing circuitry. The processing circuitry is configured to collect sensing data on the infrastructure, receive a control instruction for the sensing data from a server, control the infrastructure based on the received control instruction and detect a failure in a communication with the server. The processing circuitry is further configured to control, upon detecting the failure, the infrastructure based on the sensing data on the infrastructure, determine, upon detecting a recovery from the failure, a shift timing to return to the control based on the control instruction from the control based on the sensing data on the infrastructure, and continue the control based on the sensing data on the infrastructure until the shift timing.

FIG. 1 is a view showing an example of a system according to an embodiment. FIG. 1 illustrates an example of a system known as a so-called smart grid. In an existing grid, existing power plants such as a nuclear power plant, a thermal power plant, and a hydroelectric power plant are connected to various customers such as an ordinary household, a building, and a factory via the grid. In the next-generation power grid, distributed power supplies such as a PV (Photovoltaic Power generation) system and a wind power plant, battery devices, new transportation systems, charging stations, and the like are additionally connected to the power grid. The variety of elements can communicate via a communication grid.

Systems for managing energy are generically called EMS's (Energy Management Systems). The EMS's are classified into several groups in accordance with the scale and the like. There are, for example, an HEMS (Home Energy Management System) for an ordinary household and a BEMS (Building Energy Management System) for a building. There also exist an MEMS (Mansion Energy Management System) for an apartment house, a CEMS (Community Energy Management System) for a community, and a FEMS (Factory Energy Management System) for a factory. Fine energy optimization control is implemented by causing these systems to cooperate.

According to these systems, an advanced cooperative operation can be performed between the existing power plants, the distributed power supplies, the renewable energy sources such as sunlight and wind force, and the customers. This allows to produce a power supply service in a new and smart form, such as an energy supply system mainly using a natural energy or a customer participating-type energy supply/demand system by bidirectional cooperation of customers and companies.

A social system offers comforts and conveniences to the social life via social infrastructures represented by the above-described smart grid. The social system in the future needs to achieve a social target such as energy saving by organically combining the diverse social infrastructures using information processing technologies, communication technologies, and the like. A social infrastructure control system according to an embodiment capable of solving this problem will be described below.

FIG. 2 is a view showing an example of a social infrastructure control system according to the embodiment. FIG. 2 illustrates, as examples of social infrastructures, an electricity infrastructure 11, a new energy infrastructure 12, a road traffic infrastructure 13, a railway infrastructure 14, a water treatment infrastructure 15, and a communication infrastructure 16. The social infrastructures are not limited to those, and there exist a variety of social infrastructures such as a heat supply infrastructure, a medical infrastructure, and a building infrastructure.

The electricity infrastructure 11 can include power stations, power plants, and transmission and distribution networks. The new energy infrastructure 12 is an infrastructure such as a battery SCADA (Supervisory Control And Data Acquisition) or a PV (photovoltaic) system concerning a renewable energy. The road traffic infrastructure 13 can include traffic signals, expressway systems, and open roads.

The railway infrastructure 14 can include railway networks, railway vehicles, and ticket reservation centers. The water treatment infrastructure 15 can include water supply and drainage and water purification plants. The communication infrastructure 16 can include the Internet, Web services, SMS (Short Message Service), and twitter. The infrastructures (social infrastructures) 11 to 16 have peculiar targets to be controlled. The targets to be controlled by the infrastructures will generically be referred to as control targets hereinafter.

The infrastructures 11 to 16 are connected to an optical communication network 17. A cloud computing system 1000 is connected to the optical communication network 17 via a gateway (GW) 100. In this embodiment, the optical communication network 17 will be described as an example of a guarantee-type network. That is, in this embodiment, the cloud computing system 1000 and the infrastructures 11 to 16 are connected via a network capable of guaranteeing a communication band. For example, a VPN (Virtual Private Network) constructed on an IP (Internet Protocol) network as well as a dedicated line using an optical communication technology exists as a network of this type.

The cloud computing system 1000 comprises a server 18 and a database 19. The server 18 can be formed as a standalone computer or an aggregate of a plurality of computers. Further, the server 18 is connectable to the communication network 300 and also physically detachable or attachable to the communication network 300. The database 19 can be arranged for one computer or distributed to a plurality of computers. In this embodiment, a form including a plurality of servers 18 and a plurality of databases 19 will be considered. In such a form, the servers 18 are connected to each other via a cloud communication network 300. Note that, for example, a SCMS (Smart Community Management System) server 200 may be connected to a certain server 18 to comprehensively control the target social system.

In this embodiment, each of the infrastructures 11 to 16 comprises a local control apparatus 31. Each local control apparatus 31 can locally control the corresponding one of the infrastructures 11 to 16 as needed. That is, the local control apparatus 31 has a peculiar control function of controlling the control target in each infrastructure.

For example, the local control apparatus 31 in the electricity infrastructure 11 has a function of controlling power distribution for each consumer. The control targets in this infrastructure are applicable to, for example, breakers in an electric power substation and switching devices in feeder pathways.

The local control apparatus 31 in the new energy infrastructure 12 has a function of predicting the power generation amount of a PV system based on meteorological information. The control targets in this infrastructure are applicable to, for example, power conditioning systems installed to accompanied with a PV system.

The local control apparatus 31 in the road traffic infrastructure 13 has a function of controlling road traffic. The control targets in this infrastructure are applicable to, for example, traffic signals and road traffic signs.

The local control apparatus 31 in the railway infrastructure 14 has a function of managing operations of railways or the like. The control targets in this infrastructure are applicable to, for example, railway signals and railway switching points.

The local control apparatus 31 in the water treatment infrastructure 15 has a function of controlling the flow rates of water supply and drainage or controlling the water reserve for irrigation or in a dam. The control targets in this infrastructure are applicable to, for example, the valves for controlling the amount of water discharge and movable weirs.

The local control apparatus 31 in the communication infrastructure 16 has a function of controlling the flow or routing of an IP (Internet Protocol) network or controlling call connection of an ISDN (Integrated Service Digital Network). The control targets in this infrastructure are applicable to, for example, radio base stations and base station controlling devices.

The local control apparatuses 31 can be connected to a telecommunication line of the optical communication network 17. Further, the local control apparatus 31 is physically detachable or attachable to the telecommunication lines of the optical communication network 17. The local control apparatuses 31 can communicate information to/from the servers 18 or acquire various kinds of data from the databases 19 via the telecommunication line of the optical communication network 17, or store various kinds of data in the databases 19 via the servers 18. That is, the local control apparatuses 31 and the servers 18 can be connected via the telecommunication line of the optical communication network 17 so as to mutually communicate information.

The server 18 has a function of giving the local control apparatuses 31 various kinds of instructions (including commands and control data) to control the control targets. That is, the server 18 has the position of the upper layer relative to the local control apparatuses 31 or the infrastructures 11 to 16.

The database 19 stores sensing data associated with the social infrastructures. Examples of the sensing data are meter data, sensor data, traffic, GPS (Global Positioning System) data, and life logs from various kinds of monitor control systems such as smart meters, various sensors, network monitoring apparatuses, MDMS (Meter Data Management System), and fundamental systems (Billing System). That is, sensing data are amounts measurable by some measurement means. These data are enormous in amount and are therefore also referred to as BigData in fields concerning cloud computing.

When controlling the social infrastructures, it is necessary to consider processing of data of a very large amount, real-time processing, resistance to failures (robustness), redundancy, currency continuation guarantee, disaster countermeasures, high level of security, personal information protection, data guarantee, following legal systems/regulations of individual countries, coping with communication situations of individual countries, SLA (Service Level Agreement) of each region, and the like. In this embodiment, control for real-time processing will mainly be explained.

FIG. 3 is a view showing an example of the architecture of a social system. The architecture shown in FIG. 3 is applicable to each of the various kinds of social infrastructures according to the embodiment. In the architecture shown in FIG. 3, the functions required of the social infrastructures are classified into a plurality of categories such as monitor control, analysis/summarization, charging/payment, and facility/equipment management. The control functions for a control target are divided into, for example, a local control system 310, a monitor control system 320, an operation support system 330, and an offline work system 340. Considering the cooperation between the processing categories is the key point in transferring the control function for the control target from the local side to the cloud computing system side.

The server 18 shown in FIG. 1 has the functions of the monitor control system 320, the operation support system 330, and the offline work system 340. Each local control apparatus 31 shown in FIG. 1 has the function of the local control system 310.

Referring to FIG. 3, a control system for the local facility of a social infrastructure as a control target corresponds to the local control system 310. The local control system 310 acquires the sensing data and various kinds of continuous variables of the control target in real time and controls the control target in real time.

For example, physical quantities such as a flow rate and a frequency will be exemplified. The local control system 310 acquires the measurement results of the physical quantities in real time, and converges the acquired data to specific values by loop control. For example, for control in case of a failure, the local control system 310 performs processing to quickly ensure the safety by sequence control. The situation of local control is sent to the monitor control system 320 as monitor information.

As for charging/payment, the local control system 310 acquires a sensing result of, for example, an automatic ticket gate or ETC (Electronic Toll Collection System) in traffic and executes fee/real-time payment. The information of fee/real-time payment is sent to the offline work system 340.

In addition, the local control system 310 monitors facilities concerning various kinds of social infrastructures and performs necessary control based on the result. The local control system 310 notifies the monitor control system 320 of information about the facility control. Upon receiving this information, the monitor control system 320 monitors the presence/absence of abnormalities and sends a control instruction to the local control system 310 as needed. The monitor control system 320 also notifies the offline work system 340 of monitor management information.

The monitor control system 320 functions as the upper layer system of the local control system 310. The monitor control system 320 analyzes/summarizes the monitor information transmitted from the local control system 310 by methods such as operator monitor, operator control, alert management, and history management. For, for example, operation history management, the monitor control system 320 provides information to the upper layer system in a form of reporting. The monitor control system 320 then finds optimum operation of the local control system from the operation history management and instructs operation change of the local control system.

The operation support system 330 predicts the demands of the various kinds of social infrastructures from the reporting information obtained by the monitor control system 320 and the like, and adjusts optimization based on the prediction result. The operation support system 330 makes a scheduling plan according to the adjusted contents. The plan is sent to the monitor control system 320 or the local control system 310 and reflected on the operation.

The offline work system 340 manages energy demands based on management/support information sequentially submitted by the monitor control system 320 or the operation support system 330. Based on the result, the energy flow between regions or social infrastructures is adjusted. The offline work system 340 also analyzes the management/support information and creates statistical data to be used as the materials for review and a medium- and long-term plan. The offline work system 340 executes charging processing for users based on fee/real-time payment information and steady charging/payment information from the local control system 310. The offline work system 340 receives facility management information from the monitor control system 320 and instructs to execute maintenance and diagnosis of equipment.

First Embodiment

FIG. 4 is a conceptual view showing the cooperation between a local control apparatus 31 according to the first embodiment and a server 18 that is the upper layer apparatus of the local control apparatus 31. Referring to FIG. 4, the server 18 implements the function of a monitor control system 320. The local control apparatus 31 controls a control target in real time in accordance with operation processing by a main control unit 311. At this time, the local control apparatus 31 cooperates with the server 18 in real time via a network 17.

Referring to FIG. 4, the server 18 is connectable to the optical communication network 17 via an interface which is not shown in this figure and also physically detachable or attachable to the optical communication network 17. The server 18 comprises a collection unit 18a, a calculation unit 18b, a selection unit 18c, a download unit 18d, a setting unit 18e, and a correction unit 18f.

The collection unit 18a collects sensing data (event information) uploaded from the local control apparatus 31 via the network 17 and stores the sensing data in a database 19. The calculation unit 18b analyzes the event information stored in the database 19 and calculates the characteristic of the social infrastructure.

The selection unit 18c selects a control program adequate to the characteristic calculated by the calculation unit 18b from a plurality of control programs (control programs 1 to N) stored in the database 19 in advance in correspondence with the type, the operation state, and the like of the control target. The download unit 18d download-transmits the selected control program to the local control apparatus 31 via the network 17. The setting unit 18e adjusts the parameters of the control program based on the calculated characteristic. The correction unit 18f determinates the state of the control target from the monitor result of the local control apparatus 31 and corrects the control program based on the result.

The local control apparatus 31 comprises the main control unit 311, a storage unit 313, an interface unit (I/F) 314, a communication control unit 315, a monitoring unit 316, a management unit 317, an interface unit 318, a priority control unit 319, and an autonomous control unit 350. The main control unit 311, the storage unit 313, the interface unit (I/F) 314, the communication control unit 315, the monitoring unit 316, the management unit 317, the interface unit 318, the priority control unit 319, and the autonomous control unit 350 are connected via a bus 312.

The main control unit 311 controls processing such as communication, monitoring, and management in accordance with a control program stored in the storage unit 313. The storage unit 313 comprises a queuing memory 313*a* and a control program memory 313*b*. The queuing memory 313*a* stores queuing data used to cause the main control unit 311 to execute control based on an instruction from the server 18. The control program memory 313*b* stores the control program used by the main control unit 311. Further, the control program memory 313*b* stores the degree of priority determined for each respective one of a plurality of control targets which constitute each social infrastructure. For example, the traffic signals, which are one kind of the control targets in the road or railroad infrastructures, are assigned a high degree of priority since they need to change the signals every several minutes, whereas the contents of sign plates for indicating information are assigned to a lower degree of priority as compared to that of the traffic or railroad signals.

Further, the degree of priority determined for each of the plurality of control targets can be written in the control program memory 313*b* with a terminal which is not shown in the figure, physically connectable and detachable to the local control device 31. In order to enable the operation in a priority control mode, which will be described later, the degree of priority needs to be assigned in advance to each respective one of the control targets by the terminal not shown in the figure.

The interface unit 314 enables the local control apparatus 31 connectable to the network 17 as well as physically connectable and detachable, and further the unit is designed to transmit and receive data with respect to the server 18 functioning as an upper layer control apparatus, via the network 17.

The interface unit 314 transmits/receives information to/from the server 18 serving as the upper layer control apparatus via the network 17. The communication control unit 315 appropriately controls communication with the server 18. The communication control unit 315 comprises a failure detection unit 315*a* and a path switching unit 315*b*. Upon detecting a communication failure of the network 17, the failure detection unit 315*a* notifies the main control unit 311 of it. Upon receiving the notification, the main control unit 311 autonomously executes failure avoidance processing. The path switching unit 315*b* switches the communication path when a communication failure has been detected.

The monitoring unit 316 monitors the operation state of the control target in accordance with an instruction from the main control unit 311. The management unit 317 manages the operation process of the control target in accordance with an instruction from the main control unit 311. The interface unit 318 is connected to the control target under control and transmits/receives information to/from the control target.

The priority control unit 319 reads out a control instruction queued in the queuing memory 313*a* at a timing based on a priority predetermined for each control target and outputs the control instruction to the main control unit 311. Control based on the control instruction is thus executed at a timing according to the control of the priority control unit 319. Upon detecting a communication failure for the server 18, the autonomous control unit 350 autonomously continues the control.

The local control apparatus 31 stores control instructions for the control target, which are received from the server 18, in the queuing memory of the storage unit 313. The main control unit 311 decides the priority of each queued control instruction in accordance with the priority of the control target stored in the control program memory 313*b*. The main control unit 311 notifies the server 18 of the decided priority. When notified of the priority, the server 18 further gives the local control apparatus 31 an optimum control instruction for energy saving of the whole monitor target.

The local control apparatus 31 reads out the queued control instruction from the queuing memory 313*a* in accordance with the priority of the control target stored in the control program memory 313*b*. The local control apparatus 31 controls the control target concerning each infrastructure based on the readout control instruction.

That is, control of the control target by the server 18 is basically executed in real time (direct real-time control mode). In addition, control of the control target can also be executed at a dynamically changed timing or order by priority control as the determination of the local control apparatus 31 (priority control mode). In the priority control mode, the control target is controlled at a timing according to the type, characteristic, or situation of the control target at that time.

To cause the server 18 to control the monitor target via the local control apparatus 31 in real time, it is important to ensure the communication path in the telecommunication line of the optical communication network 17 between the local control apparatus 31 and the server 18. In the first embodiment, the communication control unit 315 is provided with the failure detection unit 315*a* and the path switching unit 315*b* to prepare for a case of a communication failure. Upon detecting a communication failure, the communication control unit 315 notifies the main control unit 311 of it and causes the main control unit 311 to execute minimum autonomous control such as failure avoidance. Alternatively, upon detecting a communication failure, the communication control unit 315 switches the communication path to another communication path. As described above, in the first embodiment, safety measures against a communication failure are taken in advance. The control target is also imparted a function capable of continuing autonomous operation without a control instruction.

The key points of the above explanation are as follows.

(1) Each local control apparatus 31 queues a signal concerning a control instruction received from the server 18 in the queuing memory 313*a* for control instructions in the storage unit 313.

(2) The priority of the signal concerning the queued control instruction in accordance with the social infrastructure managed by each local control apparatus 31 is decided in accordance with the control target based on the priority stored in the control program memory 313*b*.

(3) The local control apparatus 31 notifies the server 18 of the result of priority control by, for example, a notification signal or a message. Upon receiving the notification, the server 18 performs optimization control for energy saving of the entire monitor target including a plurality of control targets.

(4) The local control apparatus 31 sequentially extracts a signal for a queued control instruction and controls the control target of each infrastructure based on the control instruction.

FIG. 5 is a flowchart showing the processing procedure until the local control apparatus 31 performs autonomous control when a failure has occurred in the communication path of the optical communication network 17 between the server 18 and the local control apparatus 31. Referring to FIG. 5, the local control apparatus 31 causes the communication control unit 31 to monitor the communication state by the communication failure detection function (steps S11 and S12). Upon detecting an abnormality, the local control apparatus 31 notifies the main control unit 311 of it and activates the autonomous control unit 350 (step S13). The local control apparatus 31 executes minimum autonomous control such as operation stop or power off (step S14).

FIG. 6 is a flowchart showing the processing procedure until the local control apparatus 31 switches the communication path when a failure has occurred in the communication path of the telecommunication line of the optical communication network 17 between the server 18 and the local control apparatus 31. Referring to FIG. 6, the local control apparatus 31 causes the communication control unit 31 to monitor the communication state by the communication failure detection function (steps S21 and S22). Upon detecting an abnormality, the local control apparatus 31 notifies the main control unit 311 of it and activates the path switching unit 315*b* (step S23). The local control apparatus 31 switches the communication path to a reserve communication path and ensure the communication path (step S24).

Note that in the above description, each of the autonomous control unit 350 and the path switching unit 315*b* is used standalone. However, the autonomous control unit 350 and the path switching unit 315*b* may cooperatively operate. That is, upon detecting a communication failure, the path switching unit 315*b* first switches the communication path to the reserve communication path. If a communication failure is still detected, the autonomous control unit 350 may execute minimum processing.

The control program memory 313*b* shown in FIG. 4 stores a control program that controls the control target in real time. The control programs stored in the database 19 of the cloud computing system 1000 are sequentially updated and registered in accordance with the type, the operation state, and the like of the control target. The local control apparatus 31 appropriately corrects the control program to control the functions of its own by the control program downloaded from the database 19 of the cloud computing system 1000.

Figure 7:
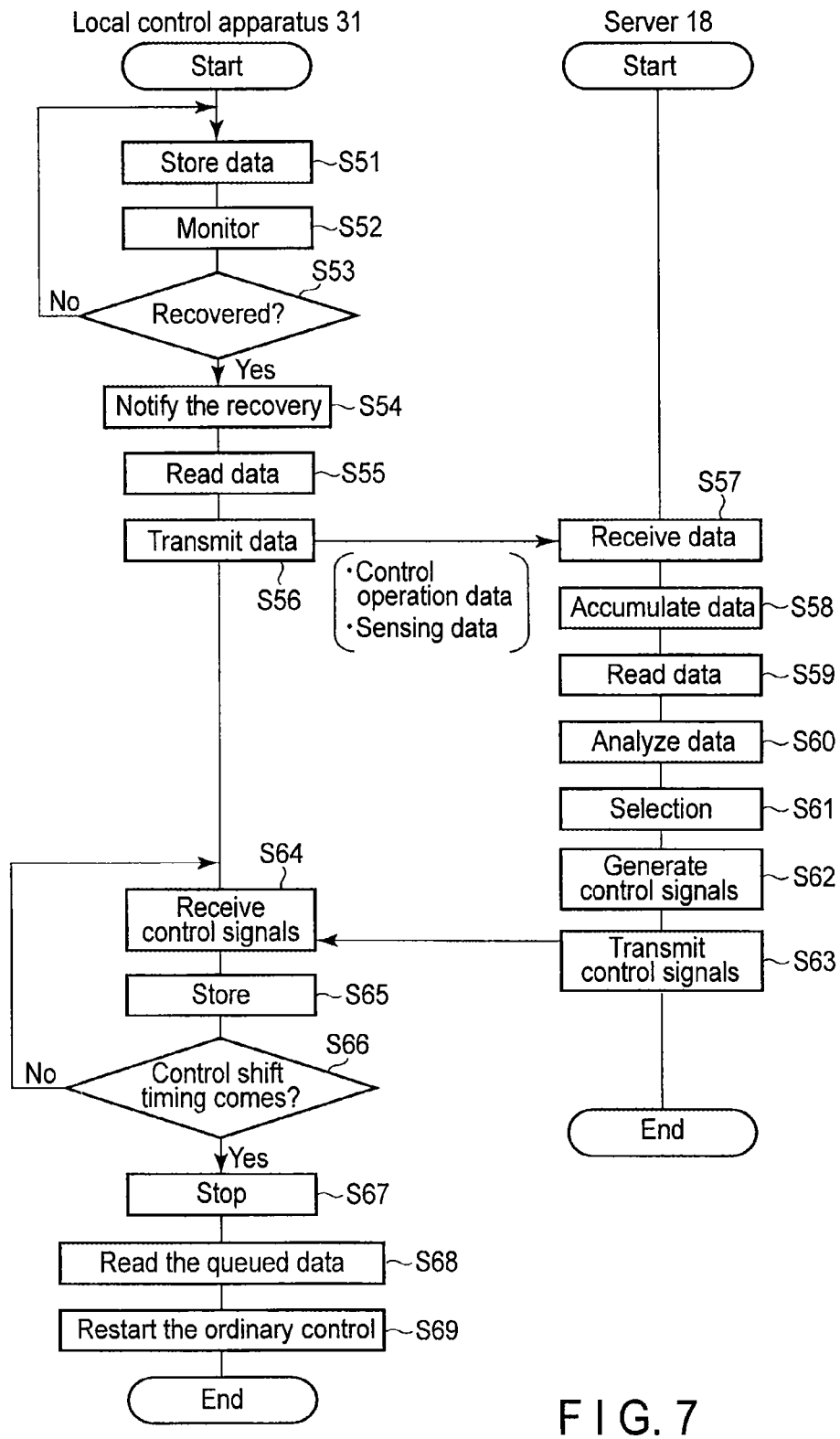
FIG. 7 is a flowchart showing the processing procedure of the local control apparatus 31 and the server 18 when a failure having been occurring in the telecommunication line of the optical communication network 17 between the server 18 and the local control apparatus 31 is recovered.

FIG. 7 is a flowchart showing the processing procedure of the local control apparatus 31 when a failure having been occurring in a communication path in the optical communication network 17 between the server 18 and the local control apparatus 31 is recovered.

The main control unit 311 of the local control apparatus 31 stores control operation data items created during the autonomous control period, in the storage unit 313 along with a time stamp of each data item which indicates when it is created (step S51). The control operation data items are those regarding the operation during the autonomous control period, for example, the operation stop and power off. The control operation data created during the autonomous control period are stored as log data in the storage unit 313. The main control unit 311 writes sensing data acquired by the sensor during the autonomous control period in the storage unit 313.

The communication control unit 315 of the local control apparatus 31 monitors the communication status of telecommunication lines of the optical communication network 17 during the autonomous control period (step S52). When a recovery of a failure is detected (step S53), the communication control unit 315 notifies so to the main control unit 311 (step S54).

When the recovery of the failure is notified, the main control unit 311 reads the control operation data and sensing data during the autonomous control period from the storage unit 313 (step S55). Then, the control operation data and sensing data read out are transmitted from the server 18 via the telecommunication lines of the optical communication network 17 (step S56).

The collection unit 18*a* of the server 18 receives the control operation data and sensing data during the autonomous operation from the local control apparatus 31 via the communication path of the optical communication network 17 (step S57), and accumulates the data in a database 19 (step S58).

The calculation unit 18*b* of the server 18 acquires the control operation data or sensing data from the database 19 (step S59) and analyze either one of both types of data as event information, thereby calculating out the characteristics of the social infrastructures of the control targets (step S60). Then, based on the results of the calculation, a selection unit 18*c* selects a control program which adaptable to the social infrastructure from the database 19 (step S61).

The database 19 stores a plurality of control programs according to the types and operation states of the control targets. The selection unit 18*c* selects a control program which adaptable to the social infrastructure out of the plurality of the control programs.

Next, the server 18 optimizes the acquired control operation data or sensing data based on the selected control program and generates a control signal (step S62). The optimization is executed based on such a standard as saving of energy of all the targets to be monitored, including a plurality of control targets. The control signal is a signal regarding a control instruction to be given to the local control apparatus 31. The server 18 transmits the generated control data to the local control apparatus 31 via the communication lines of the optical communication network 17 (step S63).

The local control apparatus 31 receives control signals from the server 18 (step S64). The local control apparatus 31 stores a first control signal received after the failure has been recovered, in the queuing memory 313*a* of the storage unit 313 (step S65). The control signals stored in the queuing memory 313*a* are read out with priority.

Next, the main control unit 311 determines the timing for shifting to the normal control from the autonomous control based on the control signal from the server 18 (step S66). To explain, if the operation is shifted to the normal control instantly from the recovery of a failure, there may rise an unexpected trouble. In order to avoid this, the main control unit 311 determines a timing enabling a smooth and continuous shifting of the control of the social infrastructure in the light of the relationship between the controlling based on the autonomous controlling program and the control based on the instruction from the server 18. The main control unit 311 continues the autonomous control until the timing for shifting comes. That is, the main control unit 311 controls the social infrastructure on the basis of the control instruction related to the control based on the autonomous controlling program.

The timing for shifting is determined with reference to the characteristics of the social infrastructure of the control target, time zone for shifting, etc., with the top priority fixed to the safety of, for example, the users of the social infrastructure of the control target and the residents of the area. For example, in the case where a failure/recovery event occurs in a railroad infrastructure, the timing is selected such that the control of the operation is not shifted during a train is on the railroad between stations unless the train reaches the nearest station.

In the meantime, when a time zone for shifting the control is late at night, and the degree of use of the social infrastructure is very low, it is possible to shift the control relatively quickly after notifying caution to the users of the social infrastructure. For example, in the case of the control for infrastructure facilities of the water treatment infrastructure shown in FIG. 10, which will be later explained, it is probable that the control is shifted immediately after the failure/recovery.

Even during the control period based on the autonomous controlling program, the sensing data from the sensor are continuously transmitted to the server 18 as mentioned before. The server 18 continuously transmits the control signals based on the sensing data to the local control apparatus 31.

When a shift timing determined by the main control unit 311 comes (Yes in step S66), the main control unit 311 stops the control instructions relating to the autonomous controlling program (step S67). Further, the main control unit 311 read out the control signal received at the point of the past which is closest to the timing of this stopping of the instructions from the queuing memory 313a of the storage unit 313 (step S68). Then, main control unit 311 restarts the control of the social infrastructure based on the contents indicated in this control signal (step S69).

As described above, as the processing procedure shown in FIG. 7 is executed between the local control apparatus 31 and the server 18 when the failure in the communication path of the optical communication network 17 is recovered, the switching/switching back of the control is executed at the optimum shift timing. In this manner, the operation can be re-optimized in the entire social system, and thus the smooth operation control of the social structures can be reliably carried out.

FIG. 8 is a flowchart showing the control program correction procedure of the local control apparatus 31. FIG. 9 is a flowchart showing the corrected control program providing procedure of the server 18.

As shown in FIG. 8, the local control apparatus 31 performs sensing of the control target (step S31) and transmits sensing data to the server 18 of the upper layer (step S32). As shown in FIG. 9, the server 18 always monitors the sensing data (step S41). The server 18 determines, based on the sensing result, whether it is necessary to change or correct the control program in accordance with the upgraded program of the control program or the situation (step S42). Upon determining that the change or correction is necessary, the server 18 selects an appropriate control program (step S43) and distributes it to the local control apparatus 31 (step S44).

The local control apparatus 31 determines the presence/absence of reception of a control program from the server 18 (step S33). Until the reception of the control program, the local control apparatus 31 executes processing using an existing control program (step S34). Upon receiving a new control program, the local control apparatus 31 replaces the control program. That is, the local control apparatus 31 stores the received control program in the storage unit 313 (step S35).

The local control apparatus 31 executes subsequent processing using the corrected control program that has replaced (step S36). The above-described processing procedure allows the server 18 to immediately recognize a change in the state of the control target. Hence, repair/exchange of the program used by the local control apparatus 31 can be executed without any necessity for dispatching an worker.

Note that a box serving as a communication adapter may be connected to the field apparatus that is the control target. The box has a function of mediating communication between the field apparatus and the local control apparatus 31. Providing the box enables the local control apparatus 31 to collect information from each device via a wired or wireless control line. The box may have a communication function of sending a control instruction to a corresponding device.

The server 18 decides the control contents based on information collected by the box serving as a communication adapter and transmits a control instruction corresponding to the control contents, thereby directly controlling the device as the control target.

The server 18 also has the function of an operation support system 330 (FIG. 3) and adjusts optimization of operation concerning processing of the local control apparatus 31 and a monitor control system 320 (FIG. 3). More specifically, the server 18 determines the appropriateness of control contents from a control instruction and monitor information from the local control apparatus 31 and the monitor control system 320 and makes an optimum operation plan. The server 18 causes the local control apparatus 31 or the monitor control system 320 to execute control according to the operation plan.

The server 18 has the function of an offline work system 340 (FIG. 3). Processes such as facility maintenance and charging/payment included in this function have many elements common to the infrastructures. In the first embodiment, the processing efficiency is improved by clouding with common works between various kinds of social infrastructures.

The function of the operation support system 330 forms a cloud system that attempts cooperation of works except elements peculiar to each domain. Since processing information from the local control apparatus 31 is obtained in real time, the processing time of the local control system can always be grasped. It is therefore possible to integrate the processing time and increase/decrease the charging cost in accordance with the processing time.

With the above-described arrangement, the server 18 is always notified of the local situation in real time. By the functions of the monitor control system 320, the operation support system 330, and the offline work system 340, the server 18 can always use the information between the systems. Hence, the efficiency of work support and operation can be improved.

FIG. 10 is a functional block diagram showing an example of a social infrastructure control system according to the first embodiment. A local control system 31A in FIG. 10, and the monitor control system 320, the online operation support system 330, and the offline operation system 340 of the upper layer are associated with the server 18. The functions of the monitor control system 320, the online operation support system 330, and the offline operation system 340 can be implemented in the server 18. A water treatment infrastructure will be described as an example of the local control system 31A.

Referring to FIG. 10, reference numeral 31A denotes the local control system of the water treatment infrastructure. The system 31A will be referred to as a water treatment local system hereinafter. For example, when a water meter 1 of a water reservoir detects a decrease in the water reserve, the water treatment local system 31A activates a motor 2 to operate a pump 3 and supply water to the water reservoir.

The water reserve is measured by a flow meter 4. The water treatment local system 31A causes an inverter 5 to adjust the rotational speed of the motor 2 such that the water reserve measured by the flow meter 4 becomes constant. The series of processes is controlled by a PLC/DDC (Programmable Logic Control/Digital data controller) 6.

The PLC/DDC 6 provides a function of collecting information of a sensor attached to the control target and a control function for the actuator. The sensor and the actuator are examples of the control target. The PLC/DDC 6 has a sequence control function of sequentially operating devices in a predetermined order. The PLC/DDC 6 also has a loop control function of controlling, for example, the rotational speed of an inverter 415 at a time constant of several hundred sec or less and making an analog value closer to a target value. The PLC/DDC 6 further has a function of receiving a failure signal as an interlock signal and properly stopping a control target device at the time of failure occurrence.

The monitor control system 320 receives process data from the PLC/DDC 6 in the water treatment local system 31A and provides the monitored situation to the operator at a predetermined period of about 1 sec. The monitor control system 320 can adjust the operation of the water treatment local system 41 in real time by transferring the control operation of the operator to the PLC/DDC 6 of the lower layer.

FIG. 11 is a functional block diagram showing another example of the social infrastructure control system according to the first embodiment. FIG. 11 shows an extended example of the cloud structure shown in FIG. 10. FIG. 11 illustrates the relationship between a local control system 31B of a water treatment system and the monitor control system 320, the online operation support system 330, and the offline operation system 340 that are the associated functions of the server 18 of the upper layer.

Referring to FIG. 11, reference numeral 31B corresponds to the local control apparatus 31A shown in FIG. 10. In the example shown in FIG. 11, the water meter 1, the motor 2, the pump 3, the flow meter 4, and the inverter 5 are connected to the network 17 via communication adapters 61, 62, 63, 64, and 65, respectively. This allows to obviate the PLC/DDC 6. Here, the communication adaptors 61, 62, 63, 64 and 65 are connected to the network 17 by cable for communication, but it is alternatively possible that they are connected wirelessly for wireless communication.

The communication adapters 61 to 65 collect the sensing data of the control target via communication lines and directly transmit the collected sensing data to the monitor control system 320 that is a function of the server 18. The monitor control system 320 grasps the state of the water treatment local system 31B from the collected sensing data, calculates appropriate control contents, and adjusts the control amount of the inverter 5.

This enables to replace the control by the PLC/DDC in the infrastructure facility with the direct control from the monitor control system 320 in the water treatment local system 31B. It is therefore possible to monitor and control at once the operations of a number of scattered control targets and facility equipment.

In accordance with the real-time sensing data collection and control of the local control apparatuses 31A and 31B and the monitor control system 320, the online operation support system 330 online supports processing of monitor control in a long term, thereby sequentially implementing optimization.

The offline operation system 340 can accept monitor information from the monitor control system 320 at an arbitrary timing and perform an operation such as statistical processing/accounting data creation. It is therefore possible to improve the operation efficiency and provide painstaking work services. Since local information can be obtained both online and offline at an arbitrary timing, actions can be taken in early stages in accordance with the local situation.

According to this embodiment, in the above-described architecture, the clouding range is widened so that the monitor control system 320 that performs host control in the server 18 includes the function of the local control apparatus 31. That is, the server 18 attempts clouding to implement the real-time characteristic and resistance to failures for monitor/control in cooperation with the local control apparatus 31 as the function of the monitor control system 320. This makes it possible to implement efficient operation of monitor control and largely decrease the cost of construction of a social infrastructure control system.

In the first embodiment, the local control apparatus 31 has the initiative to decide the priority order of control, that is, priority control of the control target. This allows to prefer to control in a domain closer to a site and ensure safety associated with the operation of the social system.

As described above, according to the first embodiment, it is possible to implement cooperation between the local control system and the upper layer management system of the control target of a social infrastructure and consistency and real-time characteristic of mutual information in cooperation between regions. It is therefore possible to provide a social infrastructure control system capable of implementing appropriate processing in overall determination/control and a control method thereof.

Second Embodiment

FIG. 12 is a functional block diagram showing an example of a local control apparatus 31 and a server 18 according to the second embodiment. The same reference numerals as in FIG. 4 denote the same parts in FIG. 12, and only different parts will be described here.

The server 18 shown in FIG. 12 basically has the same functions as those of the server 18 shown in FIG. 4. The local control apparatus 31 shown in FIG. 12 basically has the same functions as those of the local control apparatus 31 shown in FIG. 4.

The local control apparatus 31 comprises a collection unit 321 in addition to the functions shown in FIG. 4. The collection unit 321 collects sensing data from a plurality of control targets of social infrastructures. The collection unit 321 can be implemented as one function of a monitoring unit 316.

The local control apparatus 31 further comprises a transmission unit 322. The transmission unit 322 transmits the collected sensing data to the server 18 via a telecommunication line of an optical communication network 17. The local control apparatus 31 also comprises a reception unit 323. The reception unit 323 receives a control instruction to control the control target from the server 18.

A main control unit 311 controls the control target based on the control instruction received by the reception unit 323. That is, the main control unit 311 executes control of a plurality of control targets based on the control instruction at a timing based on a priority defined for each control target.

The local control apparatus 31 also comprises a notification unit 324. The notification unit 324 notifies the server 18 of the result of control of the control target. The result of control includes the time stamp of the point of time the control has been done and OK/NG of the control in addition to a change in the sensing data according to the control.

The server 18 comprises an acquisition unit 18*j*, a generation unit 18*g*, an instruction unit 18*h*, a priority control unit 18*i*, and a queuing memory 18*l* in addition to the functions shown in FIG. 4. The acquisition unit 18*j* can be implemented as one function of the collection unit 18*a*.

The acquisition unit 18*j* acquires sensing data transmitted from the local control apparatus 18 via the telecommunication line of the optical communication network 17 in real time. The acquired sensing data is stored in a database 19.

The generation unit 18*g* processes the sensing data stored in the database 19 and generates a control instruction to control the control targets in infrastructures 11 to 16. The instruction unit 18*h* transmits the generated control instruction to the local control apparatus 31. The queuing memory 18*l* queues the generated control instruction.

The priority control unit 18*i* reads out the control instruction queued in the queuing memory 18*l* at a timing based on a priority determined for the control target and transfers it to the instruction unit 18*h*. The control instruction thus reaches the local control apparatus 31 in accordance with the priority-controlled or sequence-controlled timing. The local control apparatus 31 controls the control target based on the received control instruction.

The priority control of the local control apparatus 31 can change the control procedure for each control target under the local control apparatus 31. That is, the control procedure is dynamically controlled in a state closed in single social infrastructures (electricity, road systems, and the like). In, for example, the railway infrastructure 14, a control procedure of, for example, raising a crossing gate after the arrival of a train at a station is controlled for control targets belonging to the same social infrastructure.

In the second embodiment, the control procedure of the control target can dynamically be changed between all social infrastructures under the server 18. For example, in case of a blackout (electricity infrastructure), control can be performed to move a train to a nearest station using the standby power system of the train (railway infrastructure) and then stop the train after completion of the movement. That is, in the second embodiment, comprehensive optimum control for a plurality of social infrastructures becomes possible.

In the second embodiment as well, the local control apparatus 31 notifies the server 18 of a control result based on a control instruction, as in the first embodiment. Hence, according to the second embodiment as well, the same effects as in the first embodiment can be obtained.

Note that the present invention is not limited to the above-described embodiments. For example, in the above-described embodiments, the architecture is divided into the local control system, the monitor control system, the operation support system, and the offline operation system. However, the present invention is not limited to this. The control systems may be integrated or subdivided, or a control system having another element may be added.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus for an infrastructure control system to control an infrastructure, the control apparatus comprising at least one processing circuitry configured to:
   collect sensing data on the infrastructure;
   receive a control instruction for the sensing data from a server;
   control the infrastructure based on the received control instruction; and
   detect a failure in a communication with the server,
   wherein the processing circuitry is further configured to:
   control, upon detecting the failure, the infrastructure based on the sensing data on the infrastructure;
   determine, upon detecting a recovery from the failure, a shift timing to return to the control based on the control instruction from the control based on the sensing data on the infrastructure; and
   continue the control based on the sensing data on the infrastructure until the shift timing.

2. The control apparatus of claim 1, further comprising a storage to queue the received control instruction,
   wherein the processing circuitry is further configured to read the queued control instruction at a timing based on a priority determined for each infrastructure, and use the control instruction for controlling the infrastructure.

3. The control apparatus of claim 1, wherein the processing circuitry is further configured to notify the server of a result of controlling the infrastructure.

4. The control apparatus of claim 1, wherein the processing circuitry is further configured to:
   collect information from the infrastructure via a communication adapter provided between the control apparatus and the infrastructure; and
   send the control instruction to the corresponding infrastructure.

5. The control apparatus of claim 1, wherein the processing circuitry is further configured to determine the shift timing with reference to at least one of a characteristic of the infrastructure and a time zone.

6. The control apparatus of claim 1, wherein the processing circuitry is further configured to switch, upon detecting the failure, a communication path to the server in order to continue cooperation with the server.

7. A control apparatus for an infrastructure control system to control an infrastructure, the control apparatus comprising at least one processing circuitry configured to:
   collect sensing data on the infrastructure;
   receive a control instruction for the sensing data from a server;
   control the infrastructure based on the received control instruction and the sensing data; and
   detect a failure in a communication with the server,
   wherein the processing circuitry is further configured to:
   control, upon detecting the failure, the infrastructure based on the sensing data on the infrastructure;
   determine, upon detecting a recovery from the failure, a shift timing to return to the control based on the control instruction and the sensing data on the infrastructure; and
   continue the control based on the sensing data on the infrastructure until the shift timing.

8. A control apparatus for an infrastructure control system to control an infrastructure, the control apparatus comprising at least one processing circuitry configured to:

receive, from a server, a control instruction for sensing data on the infrastructure;
control the infrastructure based on the received control instruction; and
detect a failure in a communication with the server,
wherein the processing circuitry is further configured to:
execute, upon detecting the failure, autonomous control for the infrastructure;
determine, upon detecting a recovery from the failure, a shift timing to return to the control based on the control instruction from the autonomous control; and
continue the autonomous control until the shift timing.

9. A control method applicable to a control apparatus to control an infrastructure, the control method comprising causing the control apparatus to:
collect sensing data on the infrastructure;
receive a control instruction for the sensing data from a server configured to communicate with the control apparatus;
control the infrastructure based on the received control instruction;
control, upon detecting a failure in a communication with the server, the infrastructure based on the sensing data on the infrastructure;
determine, upon detecting a recovery from the failure, a shift timing to return to the control based on the control instruction from the control based on the sensing data on the infrastructure; and
continue the control based on the sensing data on the infrastructure until the shift timing.

10. The control method of claim 9, further comprising causing the control apparatus to:
queue the received control instruction in a storage;
read the queued control instruction from the storage at a timing based on a priority determined for each infrastructure; and
control the infrastructure based on the read control instruction.

11. The control method of claim 9, further comprising causing the control apparatus to notify the server of a result of controlling the infrastructure.

12. A control method applicable to a control apparatus to control an infrastructure, the control method comprising causing the control apparatus to:
collect sensing data on the infrastructure;
receive a control instruction for the sensing data from a server configured to communicate with the control apparatus;
control the infrastructure based on the received control instruction and the sensing data;
control, upon detecting a failure in a communication with the server, the infrastructure based on the sensing data on the infrastructure;
determine, upon detecting a recovery from the failure, a shift timing to return to the control based on the control instruction received from the server and the sensing data on the infrastructure; and
continue the control based on the sensing data on the infrastructure until the shift timing.

13. A control method applicable to a control apparatus to control an infrastructure, the control method comprising causing the control apparatus to:
receive a control instruction for sensing data on the infrastructure, from a server configured to communicate with the control apparatus;
control the infrastructure based on the received control instruction;
execute, upon detecting a failure in a communication with the server, autonomous control for the infrastructure;
determine, upon detecting a recovery from the failure, a shift timing to return to the control based on the control instruction from the autonomous control; and
continue the autonomous control until the shift timing.

14. An infrastructure control system comprising:
a control apparatus to control an infrastructure; and
a server,
the control apparatus comprising at least one processing circuitry configured to:
collect sensing data on the infrastructure;
receive a control instruction for the sensing data from the server;
control the infrastructure based on the received control instruction; and
detect a failure in a communication with the server,
wherein the processing circuitry is further configured to:
control, upon detecting the failure, the infrastructure based on the sensing data on the infrastructure;
determine, upon detecting a recovery from the failure, a shift timing to return to the control based on the control instruction from the control based on the sensing data on the infrastructure; and
continue the control based on the sensing data on the infrastructure until the shift timing.

15. An infrastructure control system comprising:
a control apparatus to control an infrastructure; and
a server,
the control apparatus comprising at least one processing circuitry configured to:
collect sensing data on the infrastructure;
receive a control instruction for the sensing data from the server;
control the infrastructure based on the received control instruction and the sensing data; and
detect a failure in a communication with the server,
wherein the processing circuitry is further configured to:
control, upon detecting the failure, the infrastructure based on the sensing data on the infrastructure;
determine, upon detecting a recovery from the failure, a shift timing to return to the control based on the control instruction and the sensing data on the infrastructure; and
continue the control based on the sensing data on the infrastructure until the shift timing.

16. An infrastructure control system comprising:
a control apparatus to control an infrastructure; and
a server,
the control apparatus comprising at least one processing circuitry configured to:
receive, from the server, a control instruction for sensing data on the infrastructure;
control the infrastructure based on the received control instruction; and
detect a failure in a communication with the server,
wherein the processing circuitry is further configured to:
execute, upon detecting the failure, autonomous control for the infrastructure;
determine, upon detecting a recovery from the failure, a shift timing to return to the control based on the control instruction from the autonomous control; and
continue the autonomous control until the shift timing.

* * * * *